STEREOPHONIC TRANSMISSION SYSTEM

Filed Jan. 13, 1956

INVENTOR
ALEXANDRE DAUGUET
BY [signature]
AGENT

United States Patent Office 2,874,221
Patented Feb. 17, 1959

2,874,221

STEREOPHONIC TRANSMISSION SYSTEM

Alexandre Dauguet, Paris, France, assignor, by mesne assignments, to North American Philips Company, Inc., New York, N. Y., a corporation of Delaware Application January 13, 1956, Serial No. 559,017

Claims priority, application France January 17, 1955

2 Claims. (Cl. 179—15)

The invention relates to stereophonic transmission systems and to transmitters and receivers for use therein, which transmission systems can be used advantageously for sound recording, transmission by conductors, wireless transmission with the use of amplitude modulation or frequency modulation and the like.

In this system, the transmission device is provided with two transmission channels connected to a common output circuit, the first transmission channel comprising a summation device and the second channel comprising a subtraction device. At the receiver end, the signals which are received through a common input circuit are supplied to a first and second reception channel, which reception channels at the output ends are provided with a summation device and a subtraction device of which the by summation and subtraction obtained output signals are supplied to separate reproduction devices.

It is an object of the invention to provide a particularly advantageous stereophonic transmission system of the kind described and transmitters and receivers for use therein, by means of which a high transmission quality is obtained and the band width required for the transmission of the stereophonic signals is reduced.

The system in accordance with the invention is characterized in that, at the transmitter-end, the sum signal is supplied directly to the common output circuit, whereas the difference signal is supplied to this output circuit through the cascade arrangement of a filter which suppresses the highest signal frequencies and of a single-sideband modulator having an auxiliary carrier-wave oscillator connected to it which transposes the difference signal with reduced band-width to a frequency-band lying above the highest signal frequency to be transmitted, whilst, at the receiver-end, the common input circuit is connected to the two reception channels by way of separating filters, the sum signal occurring in the first reception channel being supplied directly to a summation- and subtraction device connected in the output circuit of both channels, to which device the single-sideband difference signal modulate on the auxiliary carrier-wave frequency occurring in the second reception channel is supplied through a demodulator stage.

In the system in accordance with the invention, the difference signal can be transmitted with a considerably reduced band width, for example about 2000 C./S., which permits the use of a comparatively small additional band width for the stereophonic transmission. In spite of the highly limited band width of the difference signal, which signal consequently gives an unpleasant sound impression per se, the stereophonic sound image reproduced at the receiver end proves to be very satisfactory.

In order to demodulate the single-sideband difference signal by which the auxiliary carrier-wave frequency is modulated, at the receiver-end the auxiliary carrier-wave frequency can be recovered and be supplied to the demodulator stage for demodulation of the single-sideband signal. As an alternative, the auxiliary carrier-wave frequency may be transmitted together with the single-sideband difference signal by which it is modulated in which event the demodulation can be effected by means of an amplitude detector or a quadratic detector.

The invention and its advantages will now be described more fully with reference to the figures.

Figure 1:
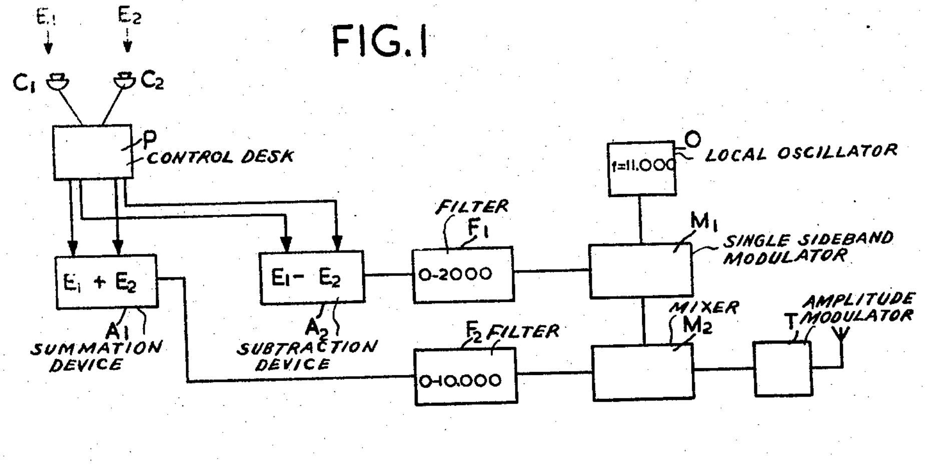
Fig. 1 shows a stereophonic transmission arrangement in accordance with the invention.

Fig. 1 shows a stereophonic transmitter in accordance with the invention, in which the associated stereophonic signals $E_1$ and $E_2$ are taken from two microphones $C_1$ and $C_2$, which microphones may, for example, be secured to an artificial head. The signals $E_1$ and $E_2$ from the microphones $C_1$ and $C_2$ are supplied, by way of a control-desk P, to a summation device and a subtraction device constituted by mixer amplifiers $A_1$ and $A_2$ respectively, the output signals of which are represented by $E_1+E_2$ and $E_1-E_2$, respectively.

Figure 2:
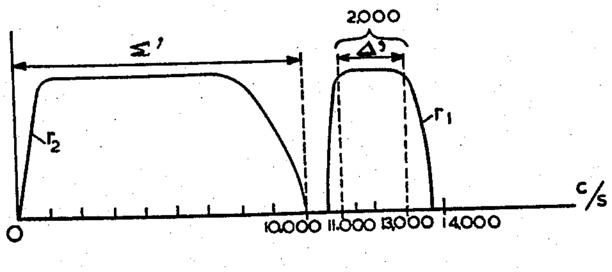
Fig. 2 is a frequency diagram of the frequency-band of the signals transmitted by the transmission arrangement shown in Fig. 1, whilst

A low-pass filter $F_2$ having a cut-off frequency of 10,000 C./S. is connected to the output of the mixer amplifier $A_1$, so that the sum signal $E_1+E_2=\Sigma'$ is transmitted with a sufficiently large band width to ensure a satisfactory quality of reproduction, whereas a low-pass filter $F_1$ having a considerably smaller cut-off frequency of, for example, about 2000 C./S., being connected to the output of the mixer amplifier $A_2$. The response characteristics of the filters $F_1$ and $F_2$ are shown in Fig. 2 by the curves $r_1$ and $r_2$ respectively, the curve $r_1$, as shown, having been shifted to a frequency range lying between 11,000 and 13,000 C./S.

In the arrangement shown, the difference signal $E_1-E_2$ derived from the low-pass filter $F_1$ is supplied to a single sideband modulator $M_1$ having a local oscillator O connected to it, which transposes the difference signal of reduced bandwidth to a frequency band lying above the highest signal frequency, which auxiliary carrier-wave frequency, may, for example, be 11,000 C./S. The auxiliary carrier-wave frequency of 11,000 C./S. is transmitted together with the transposed difference signal $\Delta'$ of reduced band width. The transposed difference signal is shown by the curve $r_1$ in Fig. 2.

In the arrangement described, the transposed difference signal $\Delta'$ is added in a mixer amplifier $M_2$ to the sum signal $\Sigma'$ derived from the filter $F_2$ and supplied as a modulation voltage to an amplitude modulator stage T which is connected to an aerial. The frequency band to be transmitted is shown in the frequency diagram of Fig. 2 and, as will be seen from this figure, the band width of the transmitted stereophonic signals extends only to about 13,000 or 14,000 C./S.

At this point it should be mentioned that the signals emitted by the transmitter described can be listened to substantially without disturbances by means of a normal amplitude modulation receiver having the usual pass band extending up to about 9000 C./S. to 10,000 C./S. Obviously, in this event no stereophonic reproduction is obtained.

Figure 3:
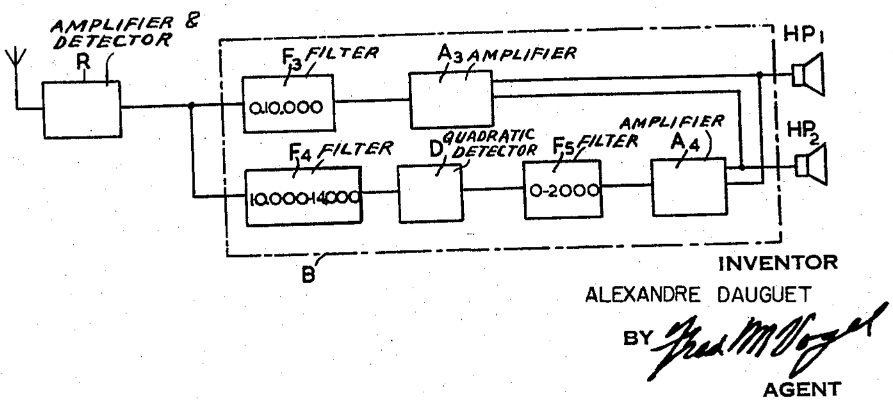
Fig. 3 shows a stereophonic reception arrangement in accordance with the invention.

Fig. 3 shows a stereophonic receiver in accordance with the invention, in which the stereophonic signals which are received by way of an aerial, after eventually high-frequency amplification, intermediate-frequency amplification and detection in a stage R are separated from one another by means of separating filters in the form of a low-pass filter $F_3$ having a cut-off frequency of 10,000 C./S. and of a band-filter $F_4$ having a pass-band between 10,000 C./S. and 14,000 C./S. The lowpass filter $F_3$ passes the sum signal which lies in the frequency-band from 0 to 10,000 C./S., whilst the band-filter $F_4$ passes the auxiliary carrier-wave frequency of 11,000 C./S. and the single-sideband difference signal by which it is modulated. In order to recover the difference signal, the single-sideband difference signal is demodulated in a quadratic detector D the output circuit of which contains a low-pass filter $F_5$ having a cut-off frequency of 2000 C./S.

In the arrangement shown, the sum signal derived from the filter $F_3$ and the difference signal derived from the filter $F_5$ are supplied to amplifiers $A_3$ and $A_4$ respectively, which amplifiers also act as a summation device and a subtraction device by coupling their output circuits in the manner shown in the figure. The output signals obtained by summation and subtraction are supplied to separate reproduction devices $HP_1$ and $HP_2$.

Thus, each of the loudspeakers $HP_1$ and $HP_2$ reproduces the signals lying between 0 and 10,000 C./S., the signal frequencies up to about 2000 C./S. being reproduced stereophonically. The stereophonic sound image reproduced by the reproduction devices $HP_1$ and $HP_2$ proves to be of very high quality.

It should be mentioned here that the summation and subtraction of the stereophonic signals can be effected by means of transformers or resistors instead of by amplifiers.

What is claimed is:

1. A stereophonic transmission system comprising a transmitter and a receiver, said transmitter comprising a first channel having a signal summation circuit, a second channel having a signal subtracting circuit, two sources of signals, means connected to apply both of said signals to both of said channels, means connected in said second channel to limit the bandwidth of the difference signal, a single-sideband modulator connected in said second channel to transpose the limited difference signal to a frequency range which is higher than the highest frequency of the signal in said first channel, common output means connected to combine the output signals of said first and second channels, and said receiver comprising first and second reception channels, means connected to apply the received signal corresponding to the output of said first transmitter channel to said first reception channel, means connected to apply the received signal corresponding to the output of said second transmitter channel to said second reception channel, a demodulator stage connected in said second reception channel to transpose the difference signal to its original frequency range, a pair of reproducing devices, and summation and subtraction circuits connected between the outputs of said first and second reception channels and said reproducing devices.

2. A system as claimed in claim 1, in which said means to limit the bandwidth of the difference signal comprises a low-pass filter having a bandwidth narrower than the bandwidth of said signal, and including a corresponding low-pass filter connected in said second reception channel to limit the bandwidth of the demodulated signal.

References Cited in the file of this patent

UNITED STATES PATENTS

| | | |
|---|---|---|
| 1,685,357 | Griggs | Sept. 25, 1928 |
| 2,536,664 | Sinnett et al. | Jan. 2, 1951 |
| 2,698,379 | Boelens et al. | Dec. 28, 1954 |
| 2,779,020 | Wilmotte | Jan. 22, 1957 |